United States Patent
Zhang

(10) Patent No.: US 11,496,053 B2
(45) Date of Patent: Nov. 8, 2022

(54) POWER CONVERSION SYSTEM WITH DC-BUS PRE-CHARGE

(71) Applicant: Delta Electronics, Inc., Taoyuan (TW)

(72) Inventor: Weiqiang Zhang, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 17/142,246

(22) Filed: Jan. 6, 2021

(65) Prior Publication Data

US 2021/0126541 A1 Apr. 29, 2021

Related U.S. Application Data

(63) Continuation-in-part of application No. 16/423,147, filed on May 27, 2019, now Pat. No. 10,917,023.

(30) Foreign Application Priority Data

Jul. 2, 2018 (CN) .......................... 201810708851.X

(51) Int. Cl.
   *H02M 1/36* (2007.01)
   *H02M 3/335* (2006.01)
   *H02M 1/00* (2006.01)
   *H02M 7/12* (2006.01)

(52) U.S. Cl.
   CPC ......... *H02M 3/335* (2013.01); *H02M 1/0074* (2021.05); *H02M 7/12* (2013.01)

(58) Field of Classification Search
   CPC .. H02M 7/4826; H02M 7/7575; H02M 7/487; H02M 7/483; H02M 7/17; H02M 7/217; H02M 7/23; H02M 7/72; H02M 1/0074; H02M 1/36; H02M 7/12
   See application file for complete search history.

(56) References Cited

U.S. PATENT DOCUMENTS

| | | | | |
|---|---|---|---|---|
| 5,892,674 A | * | 4/1999 | Shimada | H02M 5/4585 363/127 |
| 2015/0124412 A1 | * | 5/2015 | Keegan | H05K 13/00 361/734 |
| 2016/0079879 A1 | * | 3/2016 | Ronner | H02M 7/217 363/35 |
| 2016/0126858 A1 | * | 5/2016 | Wu | H02M 1/32 363/89 |
| 2016/0276938 A1 | * | 9/2016 | Mima | H02J 1/10 |
| 2017/0141694 A1 | * | 5/2017 | Keister | H02M 5/4585 |
| 2018/0159343 A1 | * | 6/2018 | Chen | H02J 7/00 |

* cited by examiner

*Primary Examiner* — Alex Torres-Rivera

(74) *Attorney, Agent, or Firm* — CKC & Partners Co., LLC

(57) ABSTRACT

A power conversion system comprises a plurality of power modules, each including a power input end; a charging input end; a power output end; at least one power conversion unit, each including an AC/DC conversion unit and at least one DC-Bus capacitor and being connected to the power input end and the power output end; and a pre-charging unit connected to the charging input end for receiving direct current and connected to the DC-Bus capacitor. The pre-charging unit starts to charge the DC-Bus capacitor of one of the power modules when said power module breaks down or the load of the power conversion system is light so that no current flows through the AC/DC conversion unit. The power input ends of the power modules are connected in series and then connected to an AC power source, and the power output ends of the power modules are connected in parallel.

13 Claims, 16 Drawing Sheets

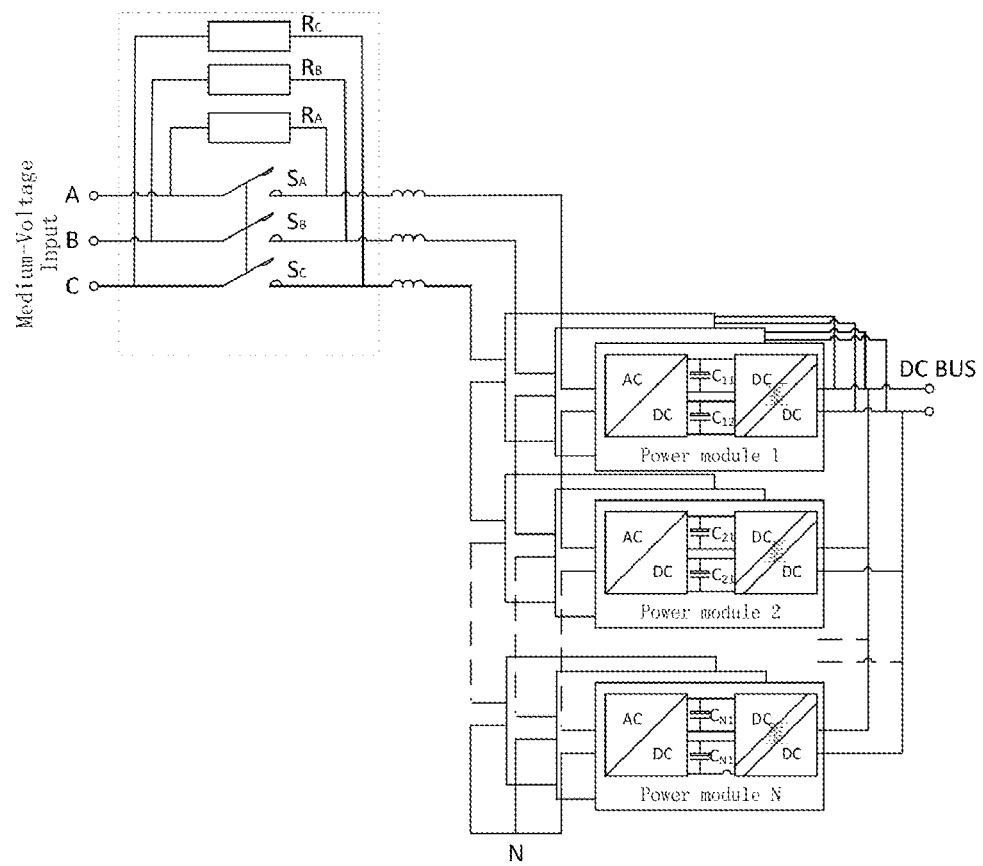
-Prior Art-Fig. 1A

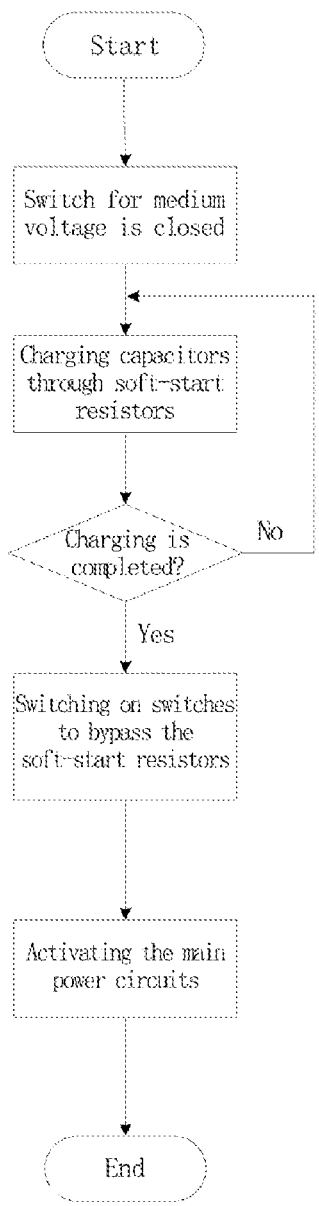
-Prior Art-Fig. 1B

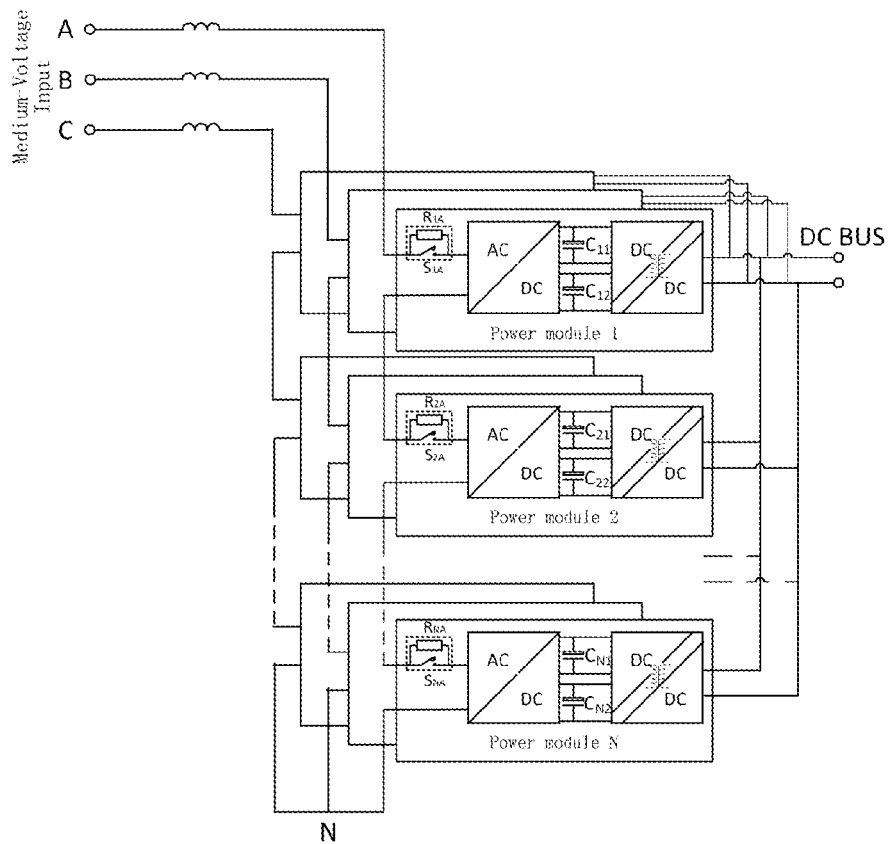
-Prior Art-Fig. 2

Converting a direct current from the charging input ends, via the pre-charging units in the plurality of power modules when the medium-voltage power conversion system is activated, to pre-charge each of the DC-Bus capacitors in the plurality of power modules;

Stopping the operations of the pre-charging units after a voltage of the DC-Bus capacitor reaches a threshold, and converting the medium-voltage alternating current from the power input ends, via the power conversion units in the plurality of the power modules, to output electrical energy at the power output ends.

Fig. 11

POWER CONVERSION SYSTEM WITH DC-BUS PRE-CHARGE

CROSS-REFERENCE TO RELATED APPLICATIONS

This non-provisional application is a Continuation-In-Part application of patent application Ser. No. 16/423,147 filed in the U.S. on May 27, 2019 which claims priority to China Application Serial Number 201810708851.X, filed Jul. 2, 2018, the entire contents of which are hereby incorporated by reference.

Some references, if any, which may include patents, patent applications, and various publications, may be cited and discussed in the description of this invention. The citation and/or discussion of such references, if any, is provided merely to clarify the description of the present invention and is not an admission that any such reference is "Prior Art" to the present invention described herein. All references listed, cited, and/or discussed in this specification are incorporated herein by reference in their entireties and to the same extent as if each reference was individually incorporated by reference.

BACKGROUND OF THE PRESENT INVENTION

1. Field of the Present Invention

The present invention relates to a power conversion system, and particularly to a power conversion system adapted for medium voltage.

2. Related Art

With the increasing demand for green smart power, voltage levels of power electronic converters have been gradually expanding from conventional and mainstream low-voltage commercial power (110-380 V) to medium-voltage distribution networks (10-35 kV), such that the power electronic devices have been applied to medium-voltage systems increasingly. Moreover, with the rapid development of Internet data centers and the electric vehicle industry, the demand for DC power supply is increasing. Demands for the diversity of applications and the diversity of system architectures require converters to be designed such that they can be easily expanded. As an efficient way to solve this problem, a plurality of power electronic converters may be combined in series or parallel, i.e., so-called combination-typed power converter. However, the pre-charging of DC-Bus capacitors in the combination-typed power converter becomes a new bottleneck. At present, to inhibit surge inrush current due to charging of the DC-Bus capacitors when the system is powered up, it is necessary to pre-charge the DC-Bus capacitors via a pre-charging circuit before the combination-typed power converter is powered up. With a trend that the levels of voltages and currents in various applications are increasing, it is highly demanded that the pre-charging circuits be designed according to the modular design of the combination-typed power converters, so as to ensure a compact hardware structure, small spatial size and lower circuit losses.

FIG. 1A shows a configuration of a power conversion system in the prior art. As shown in FIG. 1A, the power conversion system in this example includes a plurality of power modules 1 to N. Power input ends of the plurality of power modules 1 to N are cascaded at input side. Power output ends of the plurality of power modules 1 to N are connected in parallel to a DC bus at output side. Moreover, each of the power modules 1 to N includes an AC/DC conversion circuit and a DC/DC conversion circuit connected to the AC/DC conversion circuit. DC-Bus capacitors $C_{11}$, $C_{12}$, $C_{21}$, $C_{22}$, ..., $C_{N1}$, $C_{N2}$, etc., are connected between the two conversion circuits. Here, a pre-charging circuit is formed by respectively connecting soft-start resistors $R_A$, $R_B$, and $R_C$ with switches $S_A$, $S_B$, and $S_C$ in parallel, as being surrounded by a dashed block in the figure. One end of the pre-charging circuit is connected in series to phase A, phase B, and phase C of a medium-voltage input of the system. The other end of the pre-charging circuit is connected to the power input ends of the power modules, for charging the DC Bus via the AC/DC conversion circuits or the DC/DC conversion circuits in the main power circuits of the power modules 1 to N.

FIG. 1B shows a process for performing the pre-charging with the power conversion system shown in FIG. 1A. Specifically, the DC-Bus capacitors in the power modules 1 to N are charged simultaneously through soft-start resistors in respective phases when a switch for the medium voltage is closed. After a sufficient voltage is created on the DC-Bus capacitors, i.e., after the charging is completed, switches $S_A$, $S_B$, and $S_C$ in respective phases are switched on so as to bypass respective soft-start resistors $R_A$, $R_B$, and $R_C$, and then activates the main power circuits in respective power modules 1 to N. Taking phase A as an example, the DC-Bus capacitors $C_{11}$, $C_{12}$, $C_{21}$, $C_{22}$, ..., $C_{N1}$, $C_{N2}$ are charged simultaneously through the soft-start resistor $R_A$ in phase A. After the capacitor voltage of the DC-Bus capacitors $C_{11}$, $C_{12}$, $C_{21}$, $C_{22}$, ..., $C_{N1}$, $C_{N2}$ reaches a predetermined value, the switch $S_A$ is switched on so as to bypass the corresponding soft-start resistor $R_A$. Then, the power modules 1 to N may be activated for converting electrical energy.

However, the above power conversion system in the prior art has the following shortcomings.

1) First, it is limited to the voltage levels of the main power circuits in the power modules 1 to N. The soft-start resistors $R_A$, $R_B$, and $R_C$, and the switches $S_A$, $S_B$, and $S_C$ are required to be medium-voltage elements, which are large in size and lead to a high cost. For example, the size of a 10 kV SVG pre-charging circuit may be 600 mm*600 mm*600 mm in volume. Further, in control of those switches $S_A$, $S_B$, and $S_C$, the voltage level isolation at medium voltage has to be taken into consideration.

2) Second, since the pre-charging circuit is disposed in the main power circuit, the pre-charging circuit can only be fed with medium-voltage alternating current passively. The power modules 1 to N cannot be hot-plugged.

3) Third, since the soft-start resistors $R_A$, $R_B$, $R_C$ are connected in series to a main power circuit between respective power input ends of the power modules 1 to N and respective medium voltage inputs of the system, the entire system may not work when the soft-start resistors $R_A$, $R_B$, $R_C$ or the switches $S_A$, $S_B$, and $S_C$ fails.

4) Fourth, the pre-charging can only be done at one time. If additional control is not provided, there may be a risk of unbalance in capacitor voltage.

5) Fifth, when grid voltage changes, the soft-start resistors $R_A$, $R_B$, $R_C$, and the switches $S_A$, $S_B$, $S_C$ have to be redesigned.

FIG. 2 shows a configuration of another power conversion system in the prior art, in which the pre-charging circuits includes a soft-start resistor and a switch connected to the soft-start resistor in parallel. This power conversion system shown in FIG. 2 differs from the power conversion system shown in FIG. 1A in that the pre-charging circuit is distributed into respective power modules 1 to N. Specifically, a soft-start resistor is connected in series to an input end of the main power circuit in each of the power modules 1 to N, respectively. A switch is connected in parallel to the soft-start resistor in each of the power modules 1 to N. In this way, pre-charging of the DC-Bus capacitors in respective power modules may be implemented via the distributed pre-charging circuit. Taking phase A as an example, a soft-start resistor $R_{1A}$ of a power module 1 is connected in series to an AC input end of the power module 1. A switch $S_{1A}$ is connected in parallel to the soft-start resistor $R_{1A}$. A soft-start resistor $R_{2A}$ of a power module 2 is connected in series to an AC input end of the power module 2. A switch $S_{2A}$ is connected in parallel to the soft-start resistor $R_{2A}$. Similarly, a soft-start resistor $R_{NA}$ of a power module N is connected in series to an AC input end of the power module N. A switch $S_{NA}$ is connected in parallel to the soft-start resistor $R_{NA}$. Moreover, the process for pre-charging in the power conversion system shown in FIG. 2 is similar to that in FIG. 1B. Specifically, the DC-Bus capacitors in the power modules 1 to N are charged simultaneously through respective soft-start resistors when the switch for the medium voltage is closed, i.e., when the medium voltage input is switched on. After a sufficient voltage is created on the DC-Bus capacitors, i.e., after the charging is completed, the switches are switched on so as to bypass respective soft-start resistors, thereby activating the main power circuits in respective power modules 1 to N. Taking phase A as an example, the DC-Bus capacitors $C_{11}$, $C_{12}$, $C_{21}$, $C_{22}$, ..., $C_{N1}$, $C_{N2}$ are charged simultaneously through the soft-start resistors $R_A$ in phase A. After the capacitor voltage of the DC-Bus capacitors $C_{11}$, $C_{12}$, $C_{21}$, $C_{22}$, ..., $C_{N1}$, $C_{N2}$ reaches a predetermined value, the switch $S_A$ is switched on so as to bypass the corresponding soft-start resistor $R_A$. Then, the power modules 1 to N may be activated for converting electrical energy. Taking phase A as an example, when the medium voltage in phase A is switched on, the DC-Bus capacitors $C_{11}$, $C_{12}$ in the power module 1 are charged simultaneously through the soft-start resistor $R_{1A}$. The DC-Bus capacitors $C_{21}$, $C_{22}$ in the power module 2 are charged simultaneously through the soft-start resistor $R_{2A}$. After the voltage on the capacitor reaches a predetermined value, the switch $S_{1A}$ is switched on so as to bypass the corresponding soft-start resistor $R_{1A}$. Similarly, the switch $S_{2A}$ is switched on so as to bypass the corresponding soft-start resistor $R_{2A}$, and so on. Then, the power modules 1 to N are activated for converting electrical energy.

However, the above power conversion system in the prior art has the following shortcomings.

1) First, since the soft-start resistors and the switches in the pre-charging circuit are connected in series to the main power circuits of the power modules 1 to N, the current levels of those soft-start resistors and switches have to be selected depending on the current levels of the main power circuits of each power module. Therefore, those soft-start resistors and switches have a large volume. For example, the size of a single switch is not less than 50.5 mm*32.9 mm*36 mm in volume. Further, too many switches may increase the cost of the system.

2) Second, since the soft-start resistors and the switches in the pre-charging circuit are connected in series to the main power circuit of the power modules 1 to N, the entire system may not work when some soft-start resistor or some switch fails.

3) Third, since the pre-charging circuit is disposed in the main power circuit, the pre-charging circuit can only be fed with medium-voltage alternating current passively.

4) Fourth, the pre-charging can only be done at one time. If additional control is not provided, there may be a risk of unbalance in capacitor voltage.

Therefore, it is highly demanded a power conversion system to address at least some of the deficiencies of the power conversion system described above.

SUMMARY OF THE PRESENT INVENTION

In view of the above, it is an aspect of the present invention to provide a power conversion system to effectively pre-charge DC-Bus capacitors in various power modules and to allow the pre-charging circuit to be smaller in size and less in power consumption.

In one aspect, the present invention provides a power conversion system connecting to a load, comprising a plurality of power modules. Each power module includes a power input end; a charging input end; a power output end; at least one power conversion unit, each of the power conversion unit including an AC/DC conversion unit and at least one DC-Bus capacitor and being electrically connected to the power input end and the power output end, wherein the AC/DC conversion unit is electrically connected between the power input end and the DC-Bus capacitor; and a pre-charging unit electrically connected to the charging input end for receiving direct current and electrically connected to the DC-Bus capacitor for pre-charging the DC-Bus capacitor. The pre-charging unit starts to charge the DC-Bus capacitor of one of the plurality of power modules when the one of the plurality of power modules breaks down or the load of the power conversion system is light. The power input ends of the plurality of power modules are connected in series and then electrically connected to an AC power source, and the power output ends of the plurality of power modules are connected in parallel.

Hereinafter, the above description will be described in detail with reference to implementations, and a further explanation of the technical solutions of the present invention will be provided.

BRIEF DESCRIPTION OF THE DRAWINGS

To make the above and other objects, features, advantages, and examples of the present invention more apparent and straightforward, a brief description of the drawings is provided as follows:

FIG. 1A is a schematic diagram showing a configuration of a power conversion system in the prior art;

FIG. 1B is a flow chart showing a process for performing the pre-charging with the power conversion system shown in FIG. 1A;

FIG. 2 is a schematic diagram showing a configuration of another power conversion system in the prior art;

FIG. 11 is a flow chart of a pre-charging method for DC-Bus capacitors in a medium-voltage power conversion system according to one embodiment of the present invention.

DETAILED DESCRIPTION OF THE PRESENT INVENTION

Figure 3A:
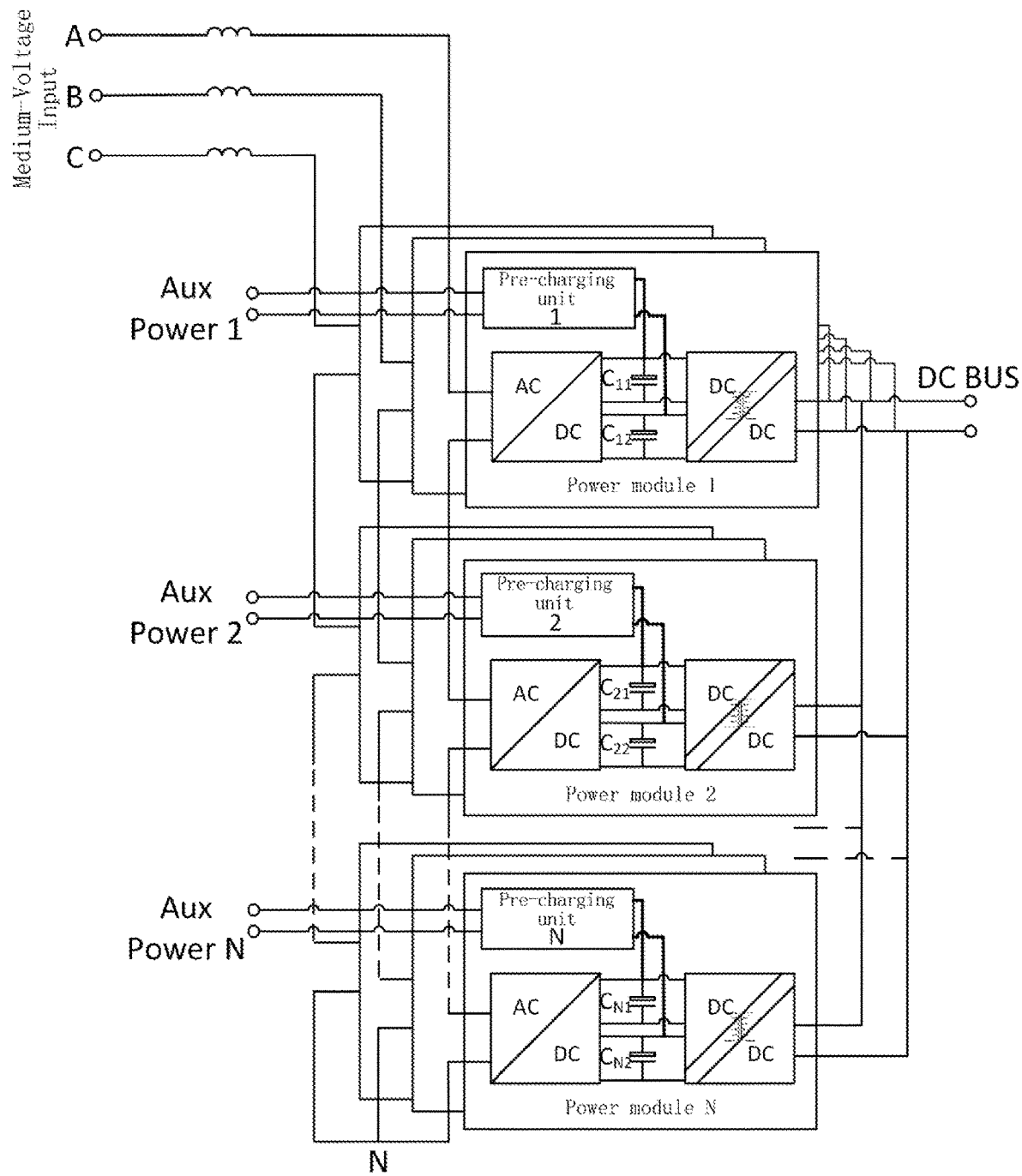
FIG. 3A is a schematic diagram showing a configuration of a power conversion system according to one embodiment of the present invention.

In order to make the description of the present invention more elaborate and complete, reference may be made to the accompanying drawings and the various examples described below. Like numbers in the drawings indicate like components. On the other hand, some known components and steps are not described in the embodiments to avoid unnecessarily limiting the present invention. In addition, some known structures and elements are shown in the drawings schematically to simplify the drawings.

FIG. 3A is a schematic diagram showing a configuration of a power conversion system according to one embodiment of the present invention. As shown in FIG. 3A, the power conversion system according to the embodiment comprises a plurality of power modules 1 to N (N is a positive integer greater than or equal to 2). The power modules 1 to N are cascaded-connected at input side and connected in parallel at output side. Each of the power modules 1 to N includes a power input end, a charging input end, and a power output end. The power input ends of the power modules 1 to N are connected in series and then electrically connected to an AC power source. For example, the power input ends of the power modules 1 to N may be connected in series and then electrically connected to phase A, phase B, and phase C of a medium-voltage three-phase AC input via an inductor. It is understood that this AC power source is not limited to a medium-voltage AC power source (with a voltage ranging from 10 kV to 35 kV), but can also be other forms of AC power sources, which is not intended to limit the present invention. The power output ends of the power modules 1 to N are connected in parallel to an output DC bus. Of course, it is understood that the power output ends of the power modules 1 to N may alternatively output independently, which is not intended to limit the present invention, either.

In the embodiments, each power module further includes a power conversion unit. The power conversion unit is electrically connected to the power input end and the power output end respectively. The power conversion unit further includes at least one DC-Bus capacitor. For example, in the embodiment shown in FIG. 3A, each of the power modules 1 to N further includes a power conversion unit including an AC/DC conversion circuit, a DC/DC conversion circuit, and the like. Specifically, power module 1 includes DC-Bus capacitors $C_{11}$ and $C_{12}$. The power module 2 includes DC-Bus capacitors $C_{21}$ and $C_{22}$. Similarly, the power module N includes DC-Bus capacitors $C_{N1}$ and $C_{N2}$. It is understood that the number and the connection of the DC-Bus capacitors in each power module are not limited to the number and the connection shown in FIG. 3A. That is, each power module may include only one DC-Bus capacitor, or include two or more DC-Bus capacitors. These DC-Bus capacitors can be connected in series, or parallel, or serve as DC-Bus capacitors of cascaded conversion units, etc., which are not intended to limit the present invention.

In the embodiments of the present invention, each power module may further include a pre-charging unit. Therein, the pre-charging unit is electrically connected to the charging input end to receive direct current, and is electrically connected to the DC-Bus capacitors to pre-charge the DC-Bus capacitors. Pre-charging refers to a process for charging a DC-bus capacitor to increase the voltage of the DC-bus capacitor before the power conversion is performed through switching operations of the power modules. In the embodiment shown in FIG. 3A, the power modules 1 to N include pre-charging units 1 to N, respectively. The pre-charging units 1 to N are connected to charging input ends of the N power modules, respectively, and are electrically connected to a plurality of auxiliary power sources Aux Power 1 to N, respectively, to receive direct current supplied from the auxiliary power sources Aux Power 1 to N. Moreover, it is understood that although the auxiliary power sources Aux Power 1 to N output direct current to the charging input ends, the auxiliary power sources Aux Power 1 to N may receive from any input sources, such as alternating current or direct current. Direct current may be output to the pre-charging units via various possible conversion circuits such as AC-DC or DC-DC conversion circuits, which will be described in more detail below.

The specific structure and operation principle of the power conversion system according to the embodiment of the present invention will be described in detail below with reference to FIGS. 4A to 4B and FIG. 3B. FIGS. 4A-4B are schematic diagrams showing the operation principle for performing pre-charging with the power conversion system according to the embodiment of the present invention. FIGS. 4A-4B also show components included in the power modules of the power conversion system according to the embodiment of the present invention and their connection relationships. To simplify the drawings and facilitating the description, FIG. 4A only shows the connection between two power modules, and only shows one DC-Bus capacitor in each power module. However, it is understood that those are not intended to limit the present invention.

In the embodiment of the present invention shown in FIG. 4A, the power module 1 (PM1) comprises a power conversion unit PCU1 and a pre-charging unit 1 (PU1). The power conversion unit PCU1 includes a DC-Bus capacitor C11. A DC-Bus capacitor may be formed by connecting a plurality of capacitors in parallel, and the present application is not limited thereto. The power module 1 (PM1) further comprises a power input end PM1-IN, a charging input end PU1-IN, and a power output end PM1-OUT. Similarly, the power module 2 (PM2) comprises a power conversion unit PCU2 and a pre-charging unit 2 (PU2). The power conversion unit PCU2 includes a DC-Bus capacitor $C_{21}$. The power module 2 (PM2) further comprises a power input end PM2-IN, a charging input end PU2-IN, and a power output end PM2-OUT.

The power module 1 (PM1) and the power module 2 (PM2) are cascaded at an input side. That is, a second input terminal $IN_{12}$ of the power input end PM1-IN of the power module 1 (PM1) is connected in series to a first input terminal $IN_{21}$ of the power input end PM2-IN of the power module 2 (PM2). Further, a first input terminal $IN_{11}$ of the power input end PM1-IN of the power module 1 (PM1) may be connected to phase A/B/C of a medium-voltage input (as shown in FIG. 3A). A second input terminal $IN_{22}$ of the power input end PM2-IN of the power module 2 (PM2) may be connected to a first input terminal of a power input end of the next power module. However, a specific way for connecting the power input ends is not limited thereto. The power output ends PM1-OUT and PM2-OUT of the power module 1 (PM1) and the power module 2 (PM2) may be connected in parallel or may output independently, or the like. However, the present invention is not limited thereto. Moreover, the pre-charging circuit 1 (PU1) and the pre-charging circuit 2 (PU2) are electrically connected to respective charging input ends PU1-IN and PU2-IN independently, and connected in parallel to the DC-Bus capacitors $C_{11}$ and $C_{21}$, respectively. Therefore, the DC-Bus capacitors in respective power modules can be pre-charged directly.

By taking a power module PM as an example, FIG. 4B shows a method for pre-charging DC-Bus capacitor $C_{DC-Bus}$ in the power module PM by a pre-charging unit in the power module PM according to the embodiment. In one embodiment, each power module PM further comprises a controller and a voltage sampling unit. The voltage sampling unit is electrically connected to the DC-Bus capacitor $C_{DC-Bus}$ to sample a voltage of the DC-Bus capacitor $C_{DC-Bus}$. The controller is electrically connected to the voltage sampling unit and the pre-charging unit in the power module PM. As such, the pre-charging unit can be controlled by the controller to perform a DC/DC voltage converting process on the received direct current so as to pre-charge the DC-Bus capacitors $C_{DC-Bus}$. Further, the voltage of the DC-Bus capacitors $C_{DC-Bus}$ can be sampled by the voltage sampling unit. The sampled values may be sent to the controller. When the voltage of the DC-Bus capacitors $C_{DC-Bus}$ reaches a threshold (i.e., when the charging is completed), the pre-charging unit can be controlled by the controller to cease the pre-charging.

Figure 3B:
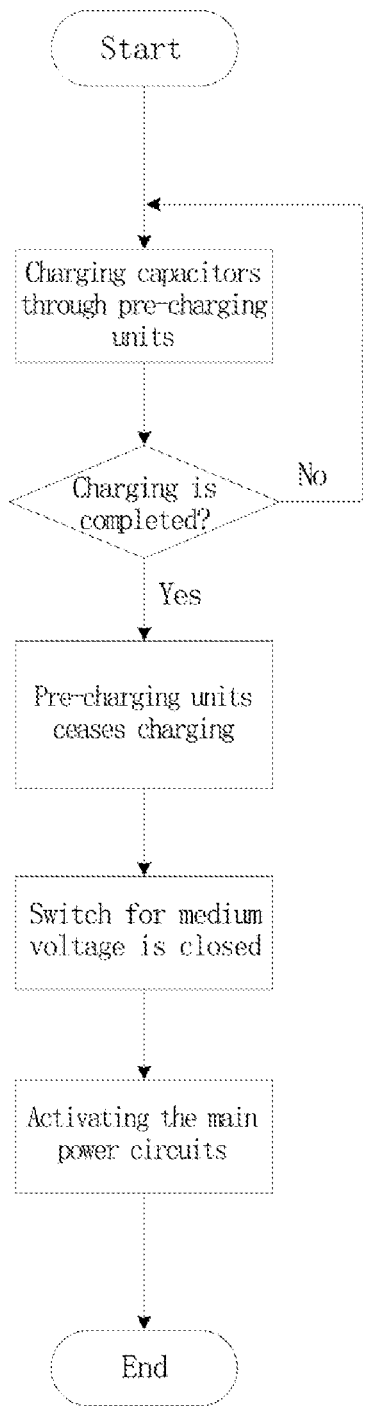
FIG. 3B is a flow chart showing a process of pre-charging using the power conversion system shown in FIG. 3A.
Figure 4A:
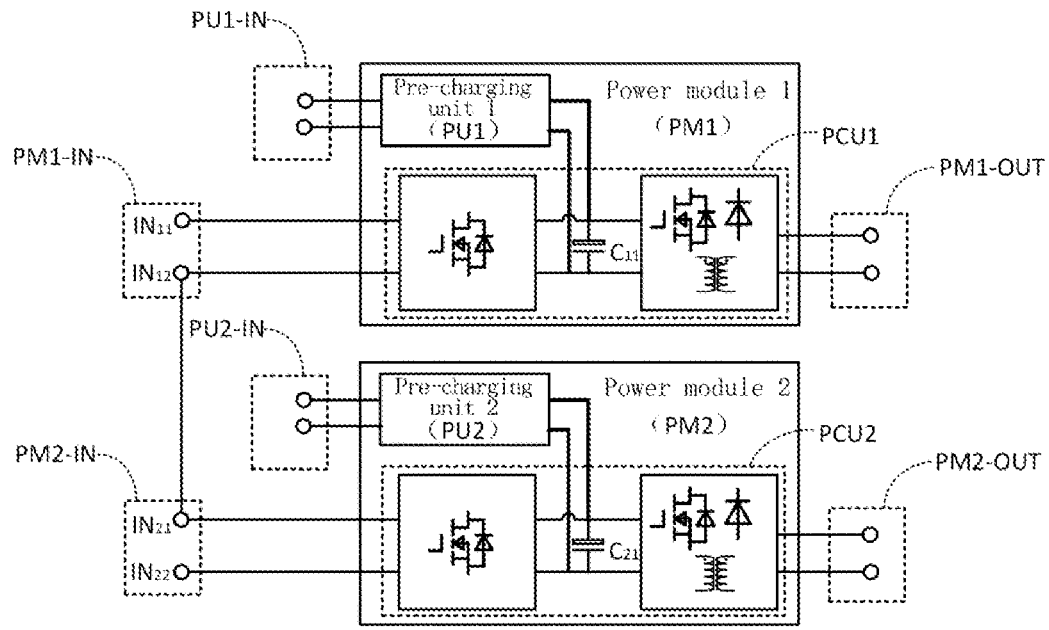
FIGS. 4A-4B are schematic diagrams showing the operation principle of pre-charging using the power conversion system according to one example of the present invention.
Figure 4B:
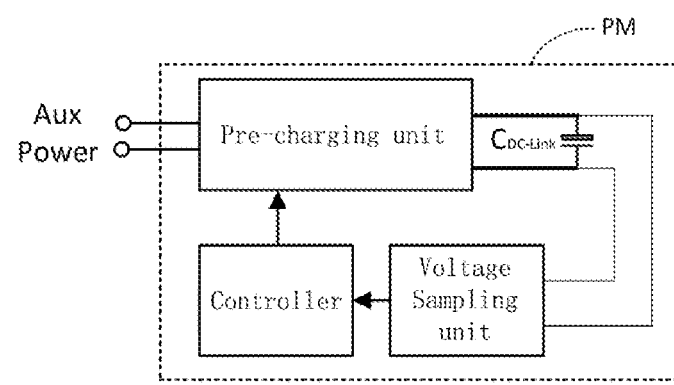

FIG. 3B is a flow chart showing a process of pre-charging using the power conversion system shown in FIG. 3A. As shown in FIG. 3B with reference to FIG. 3A, in one embodiment of the present invention, each of the power modules 1 to N of the power conversion system can charge the DC-Bus capacitors with the pre-charging units, and then can control the pre-charging units by the controller to cease charging after completion of charging. At this point, the main power circuits, such as the power conversion units, of the power modules 1 to N can be activated by switching on the medium voltage input. Therefore, the pre-charge of the DC-Bus capacitors in the power modules before switching on the medium voltage is effectively implemented in one embodiment of the present invention. During pre-charging, the auxiliary power sources Aux Powers can provide a DC input to the pre-charging units via the charging input ends. After completion of pre-charging, the medium voltage alternating current can provide an AC input to the power modules via the power input ends.

Source of the auxiliary power source Aux Power in the embodiment of the present invention will be described in detail below with reference to FIGS. 5A to 5C.

Figure 5A:
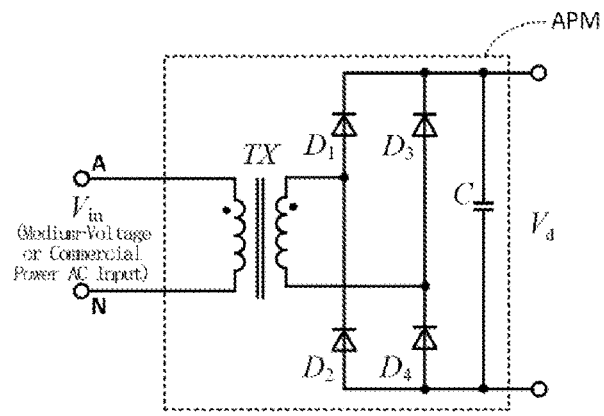
FIG. 5A is a preferred embodiment of an auxiliary power source (Aux Power) at input end of the pre-charging unit in each of the power modules of FIG. 3A.
Figure 5B:
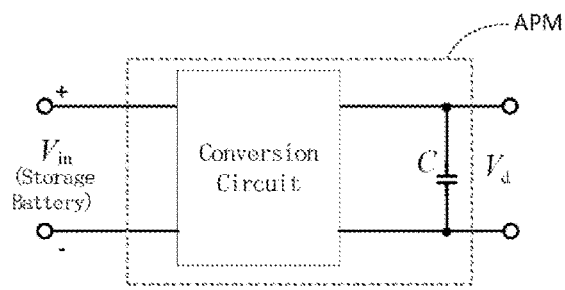
FIG. 5B is another preferred embodiment of the auxiliary power source (Aux Power) at input end of the pre-charging unit in each of the power modules of FIG. 3A.

In the embodiment shown in FIG. 3A, the plurality of auxiliary power sources Aux Powers 1 to N may be implemented as an Aux Power module (APM) as shown in FIG. 5A or FIG. 5B. The Aux Power module APM will be electrically connected to the charging input end of each of the plurality of power modules 1 to N.

As shown in FIG. 5A, the Aux Power module APM may be implemented as an AC/DC module. For example, the Aux Power module APM may include a transformer TX, a plurality of rectifier diodes $D_1$ to $D_4$, and a rectifying capacitor C. An input $V_1$ of the Aux Power module APM may receive a medium-voltage AC input of the power conversion system or an AC input of commercial power (e.g., 220V/50 Hz, 110V/60 Hz, etc.). An output $V_d$ of the Aux Power module APM is direct current. For example, power from the medium-voltage AC power source in FIG. 3A may be input the Aux Power module APM directly, stepped down by the transformer TX, regulated by the rectifier diodes $D_1$ to $D_4$ and the rectifying capacitor C, and then output to a corresponding one of the pre-charging units 1 to N directly as an output voltage $V_d$.

Alternatively, as shown in FIG. 5B, the Aux Power module APM may be implemented as a DC/DC module. For example, the Aux Power module APM may include a conversion circuit and a filter capacitor C. An input $V_{in}$ of the Aux Power module APM may be a DC input. For example, the Aux Power module APM may be electrically connected to a storage battery directly. An output $V_d$ of the Aux Power module APM may be direct current. For example, when the power conversion system is electrically connected to an external energy storage battery or a storage battery included in the power conversion system as a backup power source, the Aux Power module APM may receive power from the storage battery, the voltage of which is then converted through the DC/DC conversion circuit, such as Buck/Boost, and output to a corresponding one of the pre-charging units 1 to N as an output voltage $V_d$.

Figure 5C:
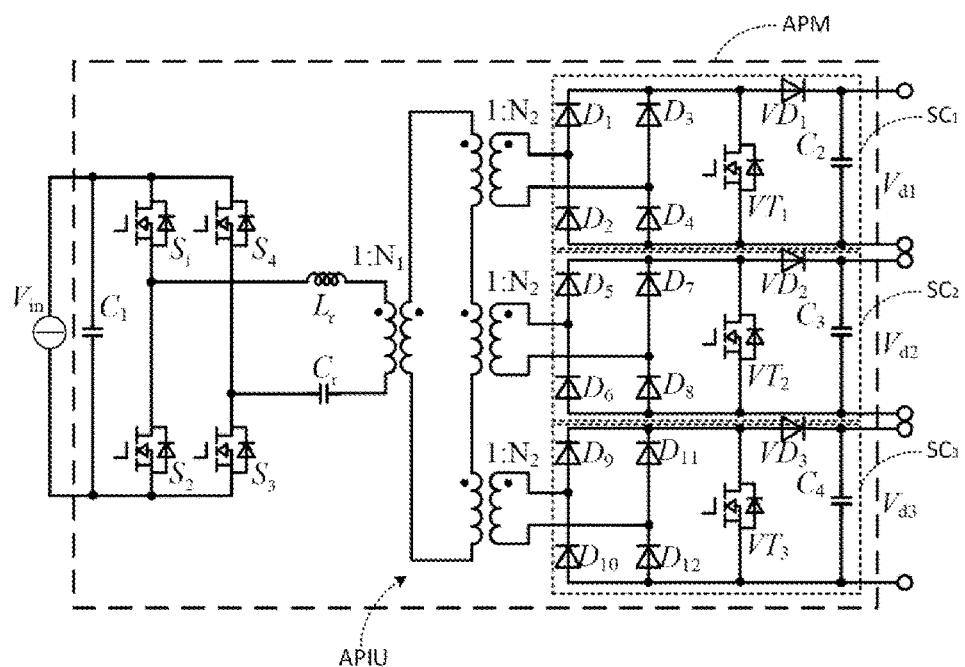
FIG. 5C is yet another preferred embodiment of the auxiliary power source Aux Power at input end of the pre-charging unit in each of the power modules of FIG. 3A.

In another embodiment, the plurality of auxiliary power sources Aux Powers 1 to N shown in FIG. 3A may be implemented as the Aux Power module APM shown in FIG. 5C. As shown in FIG. 5C, the Aux Power module APM includes an Aux power isolation unit APIU. The Aux power isolation unit APIU includes a plurality of secondary circuits that are electrically connected to the charging input ends of the plurality of power modules 1 to N, respectively. More specifically, in FIG. 5C, the Aux Power module APM includes a full-bridge LC resonant circuit, a two-stage transformer which contains two stages (1:N1 and 1:N2), and three secondary circuits $SC_1$ to $SC_3$ which may be implemented as rectifier circuits. Furthermore, the full-bridge LC resonant circuit includes a capacitor $C_1$, transistors $S_1$ to $S_4$, an inductor $L_r$, a capacitor $C_r$ and the like. The secondary circuit $SC_1$ includes diodes $D_1$ to $D_4$, a diode $VD_1$, a transistor $VT_1$, and a capacitor $C_2$. The secondary circuit $SC_2$ includes diodes $D_5$ to $D_8$, a diode $VD_2$, a transistor $VT_2$, and a capacitor $C_3$. The secondary circuit $SC_3$ includes diodes $D_9$ to $D_{12}$, a diode $VD_3$, a transistor $VT_3$, and a capacitor $C_4$. An input voltage $V_{in}$ of the Aux Power module APM may be obtained by converting the commercial power through a switching power supply, The input voltage $V_{in}$ is converted through the full-bridge LC resonant circuit, and is then voltage-converted through the two-stage transformer. Outputs from the three secondary sides of the transformer are regulated through the rectifier circuits (the secondary circuits $SC_1$ to $SC_3$), respectively, to obtain DC outputs $V_{d1}$ to $V_{d3}$. The outputs $V_{d1}$ to $V_{d3}$ may provide DC inputs for three pre-charging units, respectively. Of course, it is understood that although only three secondary circuits $SC_1$ to $SC_3$ are shown in FIG. 5C, in other embodiments, a different number of the secondary circuits may be used.

In other embodiments, the Aux Power module APM may be implemented as an AC/DC module. An input $V_{in}$ of the Aux Power module APM may be electrically connected to a medium-voltage AC power source or a commercial power. Alternatively, the Aux Power module APM may be implemented as a DC/DC module. In this embodiment, the input $V_{in}$ of the Aux Power module APM may be electrically connected to a storage battery.

It is understood that the source of the auxiliary power source Aux Power in the embodiments of the present invention is not limited to the above embodiments. Also, the circuit design for the Aux Power module APM is not limited to the above embodiments, either, and may be designed and modified depending on different inputs. The present invention is not limited thereto.

A plurality of application embodiments of the power conversion system of the present invention and a plurality of modifications of the pre-charging units therein will be described in detail below with reference to FIGS. 6-10.

Figure 6:
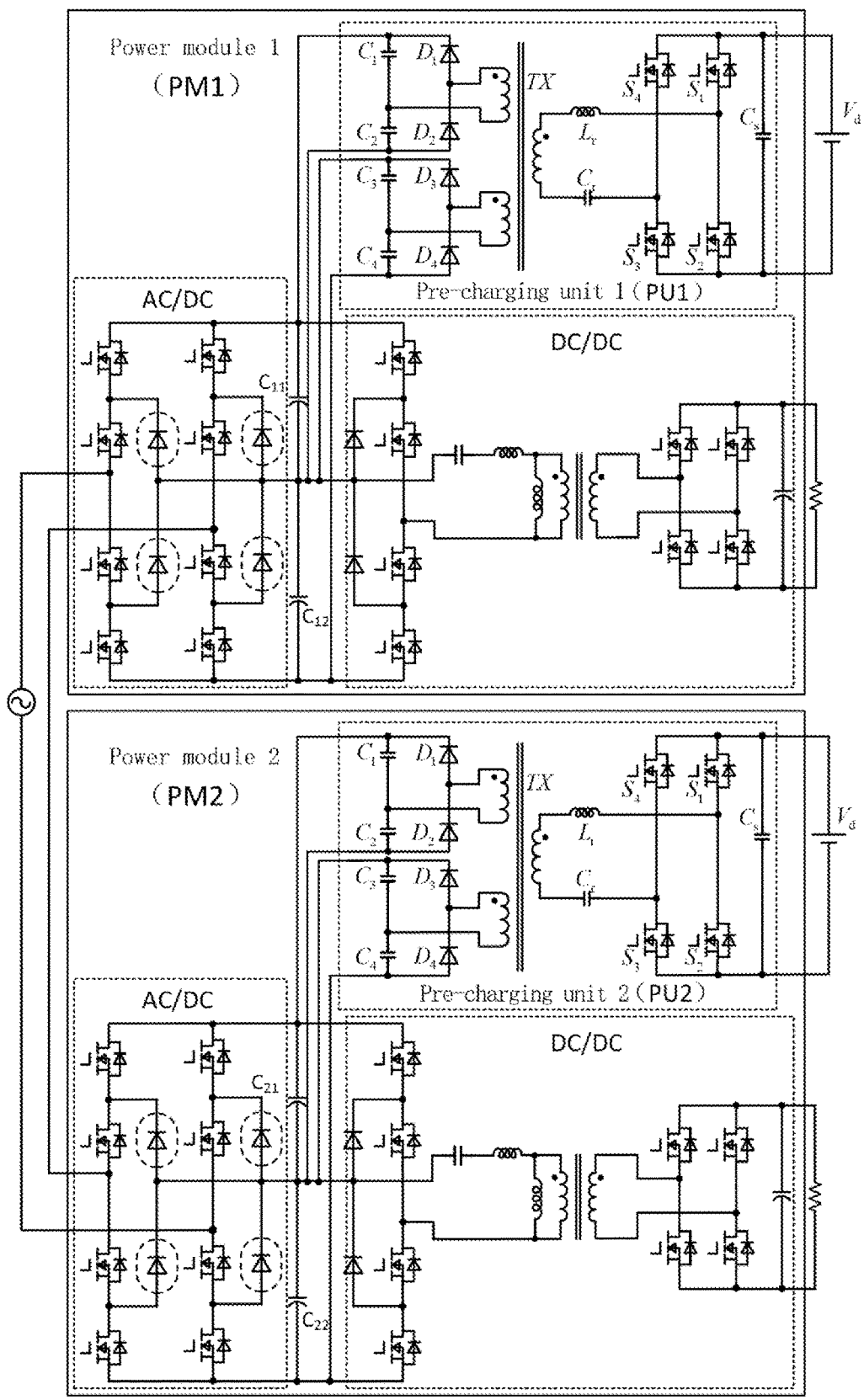
FIG. 6 is a schematic diagram showing a circuit structure of a first application embodiment in which the power conversion system of the present invention is applied to a three-level Diode Neutral Point Clamped (DNPC) cascaded system for pre-charging.

FIG. 6 is a schematic diagram showing a circuit structure of a first application embodiment in which the power conversion system of the present invention is applied to a three-level DNPC cascaded system for pre-charging. As shown in FIG. 6, the power conversion system of the first application embodiment comprises a power module 1 (PM1) and a power module 2 (PM2).

Each of the power module 1 (PM1) and the power module 2 (PM2) includes a power input end, a charging input end, an AC/DC conversion unit (AC/DC), a DC/DC conversion unit (DC/DC), and a power output end. Moreover, a power input end of the power module 2 (PM2) and a power input end of the power module 1 (PM1) are connected in series and then electrical connection with a medium-voltage AC power source.

Further, each of the power module 1 (PM1) and the power module 2 (PM2) includes two DC-Bus capacitors connected in series. For example, the power module 1 (PM1) includes DC-Bus capacitors $C_{11}$ and $C_{12}$ connected in series. The power module 2 (PM2) includes DC-Bus capacitors $C_{21}$ and $C_{22}$ connected in series. In each of the power module 1 (PM1) and the power module 2 (PM2), the AC/DC conversion unit (AC/DC) is electrically connected to the power input end, and the two DC-Bus capacitors connected in series. In each of the power module 1 (PM1) and the power module 2 (PM2), the DC/DC conversion unit (DC/DC) is electrically connected to the power output end, and the two DC-Bus capacitors connected in series.

Further, each of the power module 1 (PM1) and the power module 2 (PM2) includes a pre-charging unit. For example, the power module 1 (PM1) includes a pre-charging unit 1 (PU1). The power module 2 (PM2) includes a pre-charging unit 2 (PU2). The pre-charging unit in each of the power module 1 (PM1) and the power module 2 (PM2) includes a primary circuit, an isolation transformer, and two secondary circuits. In each pre-charging unit, the primary circuit is electrically connected to the charging input end of the power module, for receiving direct current $V_d$. Further, the two secondary circuits are electrically connected to the two DC-Bus capacitors in parallel in a one-to-one manner, in which the two DC-Bus capacitors are connected in series, so as to pre-charge the corresponding DC-Bus capacitors, respectively.

In the first application embodiment, the AC/DC conversion units (AC/DC) in each of the power module 1 (PM1) and the power module 2 (PM2) may include, for example, a three-level conversion circuit. Each of the three-level conversion circuits may include two bridge arms connected in parallel. Each bridge arm may include four transistors connected in series. The two transistors in the middle of each bridge arm are connected in parallel to two clamp diodes which are connected in series, as shown in FIG. 6.

In the first application embodiment, the DC/DC conversion units (DC/DC) in each of the power module 1 (PM1) and the power module 2 (PM2) may include, for example, an LLC resonant isolation circuit. For example, the LLC resonant isolation circuit may include an LLC resonant unit and a power isolation unit. The power isolation unit may be implemented as an integrated transformer, for example. As shown in the DC/DC part of FIG. 6, the power isolation unit is typically implemented as a transformer. The LLC resonant unit may include an LLC resonant tank. The LLC resonant tank may include a resonant inductor $L_r$ and a resonant capacitor $C_r$.

Figure 7:
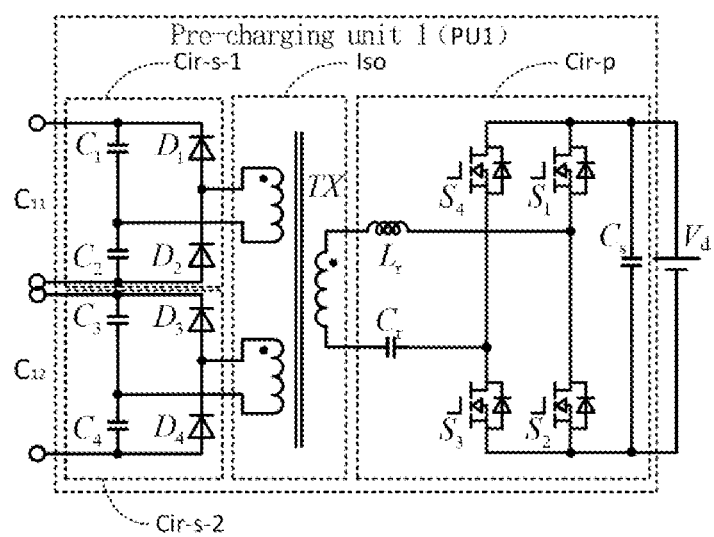
FIG. 7 is a schematic diagram showing the circuit structure of the pre-charging unit 1 disposed in the power module 1 (PM1) of FIG. 6.

In the first application embodiment, the circuit structure of the pre-charging unit 1 (PU1) in the power module 1 (PM1) may be alternatively designed as shown in FIG. 7. In FIG. 7, the pre-charging unit 1 (PU1) may be implemented in a full-bridge LC resonant circuit topology, and includes a primary circuit Cir-p, an isolation transformer Iso, and two secondary circuits Cir-s-1 and Cir-s-2. For example, the primary circuit Cir-p may be implemented as a full-bridge LC resonant circuit which includes transistors $S_1$ to $S_4$, a capacitor $C_s$, a resonant inductor $L_r$, and a resonant capacitor $C_r$. For example, the isolation transformer Iso may be implemented as a step-up transformer TX. The secondary circuit Cir-s-1 is electrically connected in parallel to both ends of the DC-Bus capacitor $C_{11}$, and, for example, may be implemented as a rectifier circuit including rectifying capacitors $C_1$, $C_2$ and rectifier diodes $D_1$, $D_2$. The secondary circuit Cir-s-2 is electrically connected in parallel to both ends of the DC-Bus capacitor $C_{12}$, and, for example, may be implemented as a rectifier circuit including rectifying capacitors $C_3$, $C_4$, and rectifier diodes $D_3$, $D_4$. As such, the pre-charging unit 1 (PU1) may receive power from the input Vd of the charging input end. Then, a square wave is generated in the primary circuit Cir-p, which is then stepped-up through the isolation transformer Iso, voltage-doubled and regulated through the secondary circuits Cir-s-1 and Cir-s-2, and then supplied for precharging the DC-Bus capacitors $C_{11}$ and $C_{12}$, respectively. The circuit structure of the pre-charging unit 2 (PU2) of the power module 2 (PM2) may be similar to that shown in FIG. 7. Therefore, detailed descriptions are omitted here. In the first application embodiment, the isolation transformer Iso and the two secondary circuits Cir-s-1 and Cir-s-2 form a pre-charging isolation unit.

Moreover, it is understood that in other embodiments of the present invention, the pre-charging unit in each of the power module 1 (PM1) and the power module 2 (PM2) is not limited to the structure shown in FIG. 7, and may be combined and modified depending on the form of the pre-charging units and the main power circuits (such as the power conversion units) in the power modules. Some examples of the pre-charging unit will be described below. However, the present invention is not limited thereto.

For example, each of the secondary circuits Cir-s-1 and Cir-s-2 in FIG. 7 may alternatively be implemented as a voltage-doubled rectifier circuit including two rectifier diodes connected in series and a rectifier capacitor. Alternatively, each of the secondary circuits Cir-s-1 and Cir-s-2 in FIG. 7 may be implemented as a single voltage rectifier circuit including four rectifier diodes. Alternatively, the primary circuit Cir-p in FIG. 7 may be implemented as an LLC resonant circuit. The above-mentioned modifications of the pre-charging unit may also be applicable to power modules including two or more DC-Bus capacitors therein, and the present application is not limited thereto.

For example, when there is only one DC bus in each power module, the number of the secondary circuits in FIG. 7 or the above-mentioned modifications of the pre-charging unit can be designed as one accordingly. However, when there are three DC-Bus capacitors connected in series in each power module, the number of the secondary circuits in FIG. 7 and the above-mentioned modifications of the pre-charging unit may be designed as three accordingly.

Furthermore, it is understood that in other embodiments of the present invention, the main power circuit (such as the power conversion unit) in each of the power module 1 (PM1) and the power module 2 (PM2) may also be modified. For example, in FIG. 6, in each of the power module 1 (PM1) and the power module 2 (PM2), the DC/DC conversion units (DC/DC) in the power conversion unit may be implemented in a series-connected half-bridge LLC circuit topology which utilizes an integrated transformer and outputs in a full-bridge structure. In other embodiments, the DC/DC converter unit (DC/DC) may alternatively be implemented in a DNPC LLC circuit topology which utilizes an integrated transformer and outputs in a full-bridge structure. The AC/DC circuit and/or the DC/DC circuit in the power module may be implemented in any circuit topologies that may realize the functions, and the present invention is not limited thereto.

For example, in FIG. 6, in each of the power modules 1 (PM1) and the power module 2 (PM2), the power conversion unit includes two DC-Bus capacitors connected in series. Each of the DC-Bus capacitors includes a plurality of groups of capacitors connected in parallel. A group of capacitors may be connected in series. However, the present application is not limited thereto. In other embodiments, a plurality of DC-Bus capacitors may be connected in parallel. Alternatively, the number of DC-Bus capacitors in each power module may be one or three or more. Further, the three or more DC-Bus capacitors may be connected in series or may be connected in other manners.

Figure 8:
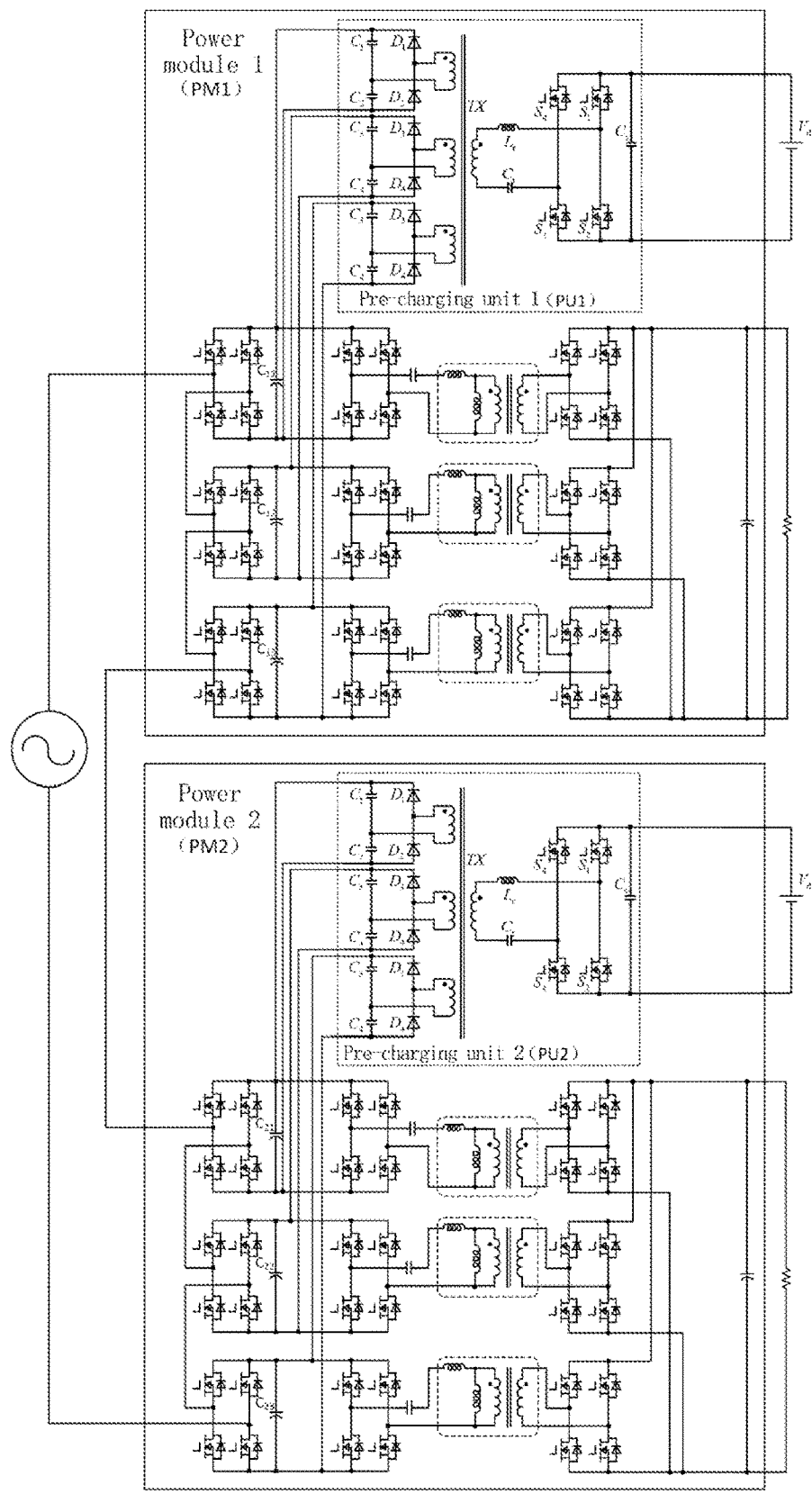
FIG. 8 is a schematic diagram showing a circuit structure of a second application embodiment in which the power conversion system of the present invention is applied to a full bridge cascaded system for pre-charging.

FIG. 8 is a schematic diagram showing a circuit structure of a second application embodiment in which the power conversion system of the present invention is applied to a full-bridge cascaded system for pre-charging. In the second application embodiment, each of the power module 1 (PM1) and the power module 2 (PM2) includes three cascaded power conversion units, each of which includes a DC-Bus capacitor. That is, the power module 1 (PM1) includes three groups of DC-Bus capacitors $C_{11}$ to $C_{13}$, while the power module 2 (PM2) includes three groups of DC-Bus capacitors $C_{21}$ to $C_{23}$. Moreover, the pre-charging isolation unit in each of the pre-charging unit 1 (PU1) of the power module 1 (PM1) and the pre-charging unit 2 (PU2) of the power module 2 (PM2) includes three secondary circuits correspondingly. The secondary circuits are electrically connected in parallel to the DC-Bus capacitors in the power conversion units, respectively.

It is understood that, in other modifications, each of the power module 1 (PM1) and the power module 2 (PM2) may alternatively include two cascaded power conversion units, each of which includes one or more DC-Bus capacitors. Correspondingly, the pre-charging isolation unit in each of the pre-charging unit 1 (PU1) of the power module 1 (PM1) and the pre-charging unit 2 (PU2) of the power module 2 (PM2) may include two secondary circuits, for pre-charging the DC-Bus capacitors in the two cascaded power conversion units, respectively. The number of the cascaded power conversion units and the number of the DC-Bus capacitors can be varied as necessary, and the present invention is not limited thereto.

Figure 9:
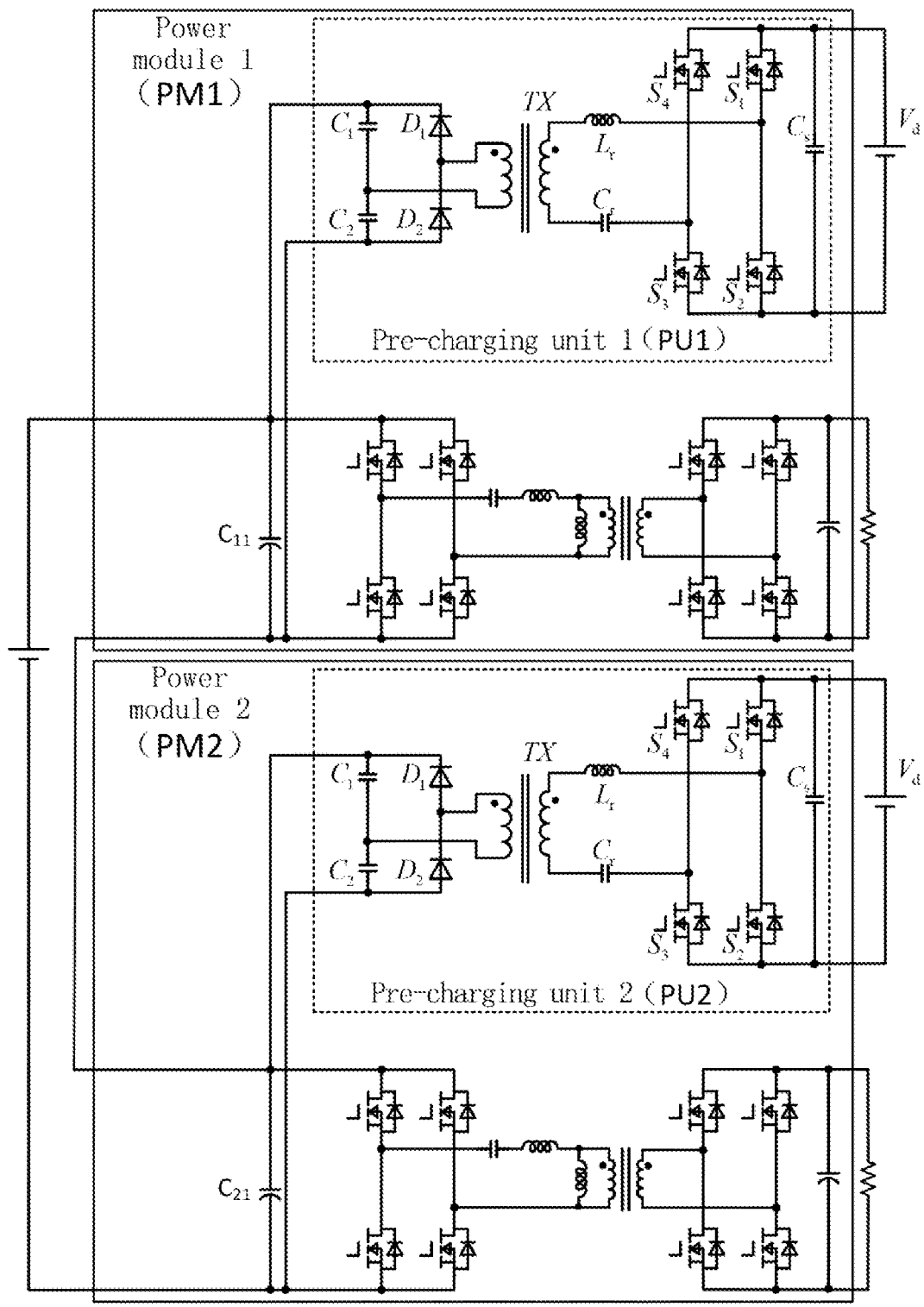
FIG. 9 is a schematic diagram showing a circuit structure of a third application embodiment in which the power conversion system of the present invention is applied to a DC/DC full-bridge system for pre-charging.

FIG. 9 is a schematic diagram showing a circuit structure of a third application embodiment in which the power conversion system of the present invention is applied to a DC/DC full-bridge system for pre-charging. In the third application embodiment, each of the power module 1 (PM1) and the power module 2 (PM2) includes a power conversion unit which may be implemented in a full-bridge LLC topology circuit structure, for example. The power module 1 (PM1) and the power module 2 (PM2) further includes DC-Bus capacitors $C_{11}$ and $C_{21}$, respectively. Correspondingly, the pre-charging isolation unit in each of the pre-charging unit 1 (PU1) of the power module 1 (PM1) and the pre-charging unit 2 (PU2) of the power module 2 (PM2) includes a secondary circuit. The secondary circuit is electrically connected in parallel to the DC-Bus capacitor directly, so as to pre-charge the DC-Bus capacitor directly.

Figure 10:
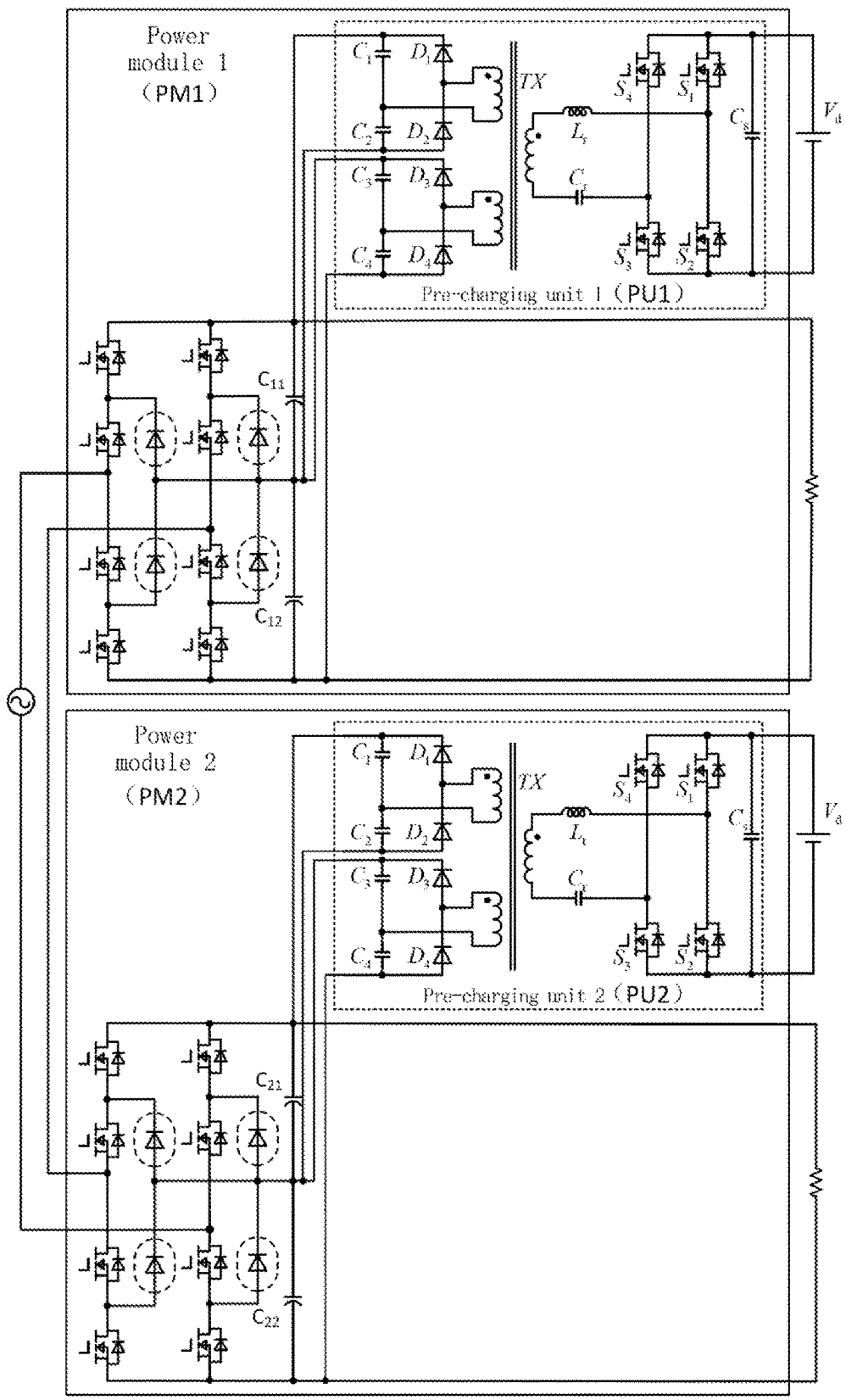
FIG. 10 is a schematic diagram showing the circuit structure of a fourth application embodiment in which the power conversion system of the present invention is applied to a three-level DNPC cascaded system for pre-charging.

FIG. 10 is a schematic diagram showing a circuit structure of a fourth application embodiment in which the power conversion system of the present invention is applied to a three-level DNPC cascaded system for pre-charging. The fourth application embodiment differs from the first application embodiment shown in FIG. 6 in that the power conversion unit in each of the power module 1 (PM1) and the power module 2 (PM2) includes an AC/DC conversion unit (AC/DC), instead of a DC/DC conversion unit (DC/DC).

FIG. 11 is a flow chart showing a method for pre-charging DC-Bus capacitors in a medium-voltage power conversion system according to one embodiment of the present invention.

As shown in FIG. 11, the method includes the following steps:

a step of converting direct current input from charging input ends, via pre-charging units in a plurality of power modules when the medium-voltage power conversion system is activated, to pre-charge each DC-Bus capacitor in the plurality of power modules; and a step of stopping the operations of the pre-charging units after a voltage of the DC-Bus capacitor reaches a threshold, and converting alternating current input from power input ends, via power conversion units in the plurality of the power modules, to output electrical energy at power output ends.

Moreover, with the pre-charging units, a certain power module may be controlled to be cut off, so that when one of the plurality of power modules breaks down or the load of the power conversion system is light, only one power module may be cut off while the other power modules operate normally. Hereafter the corresponding operation will be described in detail.

Figure 12:
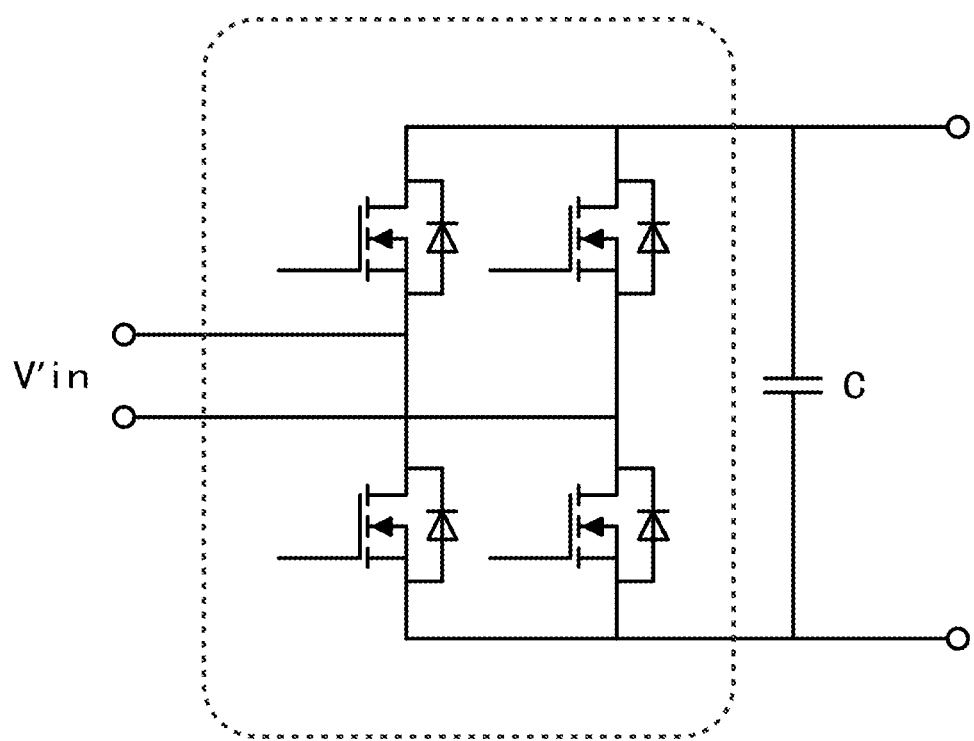
FIG. 12 is a preferred embodiment of an AC/DC conversion unit in a power conversion unit in each of the power modules of FIG. 3A.

FIG. 12 is a preferred embodiment of an AC/DC conversion unit in a power conversion unit in each of the power modules of FIG. 3A. The AC/DC conversion unit may comprise a bridge rectifier circuit which includes two bridge arms connected in parallel, each bridge arm including two transistors connected in series. Each of the transistors has a diode, which may be either a body diode of the transistor or an independent diode. When one of the plurality of power modules breaks down, driving signals for the transistors of that power module are cut off and the corresponding pre-charging unit starts to charge the DC-Bus capacitor C of that power module continuously or intermittently to a voltage higher than a voltage $V'_{in}$ at the power input end, so that the diodes in that bridge rectifier circuit are off, thereby no current flowing through the AC/DC conversion unit. As such, when a certain phase (phase A, B, or C) breaks down, only that phase is cut off while the other two phases operate normally to supply the load. In a similar manner, when the load of the power conversion system is light, i.e., less than 40% of a full-load power, the pre-charging unit for a certain power module may start to charge the DC-Bus capacitor C of the corresponding power module continuously or intermittently to a voltage higher than a voltage $V'_{in}$ at the power input end, so that no current flows through the AC/DC conversion unit in that power module. As such, when the load of the power conversion system is light, a certain power module is cut off to realize low power output.

Figure 13:
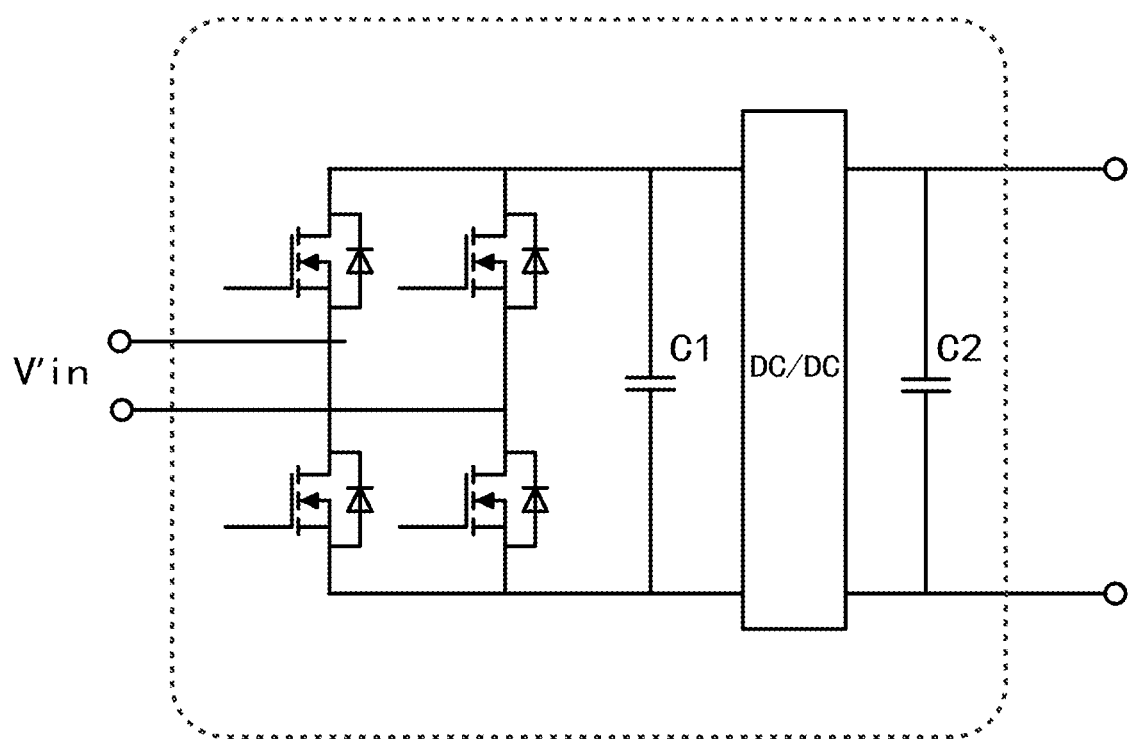
FIG. 13 is a preferred embodiment of an AC/DC conversion unit, wherein a DC/DC converter is added into the AC/DC conversion unit of FIG. 12.

It is understood that, in other modifications, the AC/DC conversion unit may further comprise a DC/DC converter, as shown in FIG. 13. The DC/DC converter may be a buck converter or a boost converter. An output of the bridge rectifier circuit is connected to a first DC-Bus capacitor $C_1$ and an input of the DC/DC converter, and an output of the DC/DC converter is connected to a second DC-Bus capacitor $C_2$. When one of the plurality of power modules breaks down or the load of the power conversion system is light, the pre-charging unit for a certain power module starts to charge the second DC-Bus capacitor $C_2$ of that power module so that a voltage on the first DC-Bus capacitor $C_1$ is higher than a voltage $V'_{in}$ at the power input end, thereby no current flowing through the AC/DC conversion unit. With the addition of a DC/DC converter in the AC/DC conversion unit, a voltage on the second DC-Bus capacitor $C_2$ may be designed flexibly, with the input voltage of the subsequent DC/DC conversion circuit being taken into consideration at the same time.

Figure 14:
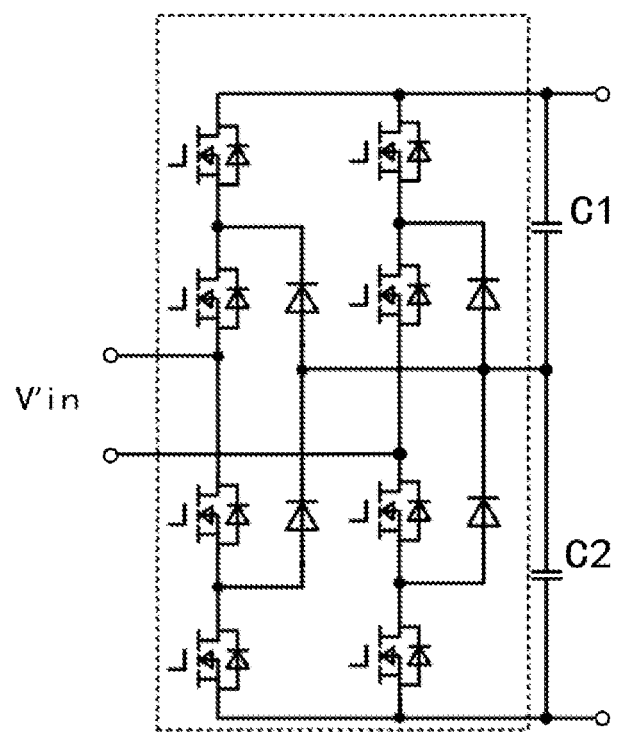
FIG. 14 is another preferred embodiment of an AC/DC conversion unit in a power conversion unit in each of the power modules of FIG. 3A.

FIG. 14 is another preferred embodiment of an AC/DC conversion unit in a power conversion unit in each of the power modules of FIG. 3A. The AC/DC conversion unit may include a three-level conversion circuit which includes two bridge arms connected in parallel. Each bridge arm may include four transistors connected in series, and each of the transistors has a diode, which may be either a body diode of the transistor or an independent diode. The two transistors in the middle of each bridge arm are connected in parallel to two clamp diodes which are connected in series. When one of the plurality of power modules breaks down, driving signals for the transistors of that power module are cut off and the corresponding pre-charging unit starts to charge the DC-Bus capacitors $C_1$, $C_2$ of that power module continuously or intermittently to a voltage higher than a voltage $V'_{in}$ at the power input end, so that the diodes in that three-level conversion circuit are off, thereby no current flowing through the AC/DC conversion unit. As such, when a certain phase (phase A, B, or C) breaks down, only that phase is cut off while the other two phases operate normally to supply the load. In a similar manner, when the load of the power conversion system is light, i.e., less than 40% of a full-load power, the pre-charging unit for a certain power module may start to charge the DC-Bus capacitor $C_1$, $C_2$ of the corresponding power module continuously or intermittently to a voltage higher than a voltage $V'_{in}$ at the power input end, so that no current flows through the AC/DC conversion unit in that power module. As such, when the load of the power conversion system is light, a certain power module is cut off to realize low power output. By adopting such a DNPC bridge rectifier circuit, the number of cascaded power units in the system can be reduced with devices of same voltage level.

In summary, in one embodiment of the present invention, each power module is provided with a pre-charging unit which is electrically connecting to a DC-Bus capacitor in the power module, so as to allow each power module to complete the pre-charging independently. Further, when the pre-charging unit in an individual power module does not work, the entire system will not fail as a result. Moreover, since the main loop current does not flow through the pre-charging unit in each power module, lower power consumption may be achieved within the same charging period. Further, the pre-charging unit may be implemented in a smaller size.

Preferably, in one embodiment of the present invention, each power module may be hot plugged by modularizing respective units in the power modules, for example, by integrating the pre-charging unit, the power conversion unit, the controller, the voltage sampling unit, and the like in each power module onto a power board.

Preferably, in one embodiment of the present invention, an auxiliary power module is used for supplying auxiliary power to each pre-charging unit in each power module independently. That is, the power may be supplied without using the medium-voltage input of the system directly, thereby helping to resume the charging from a break point, allowing to control the charging more easily, and avoiding risk of unbalance in capacitor voltage of the DC-Bus capacitors in each power module. Moreover, in one embodiment of the present invention, the DC-Bus capacitors in each power module may be pre-charged effectively before a switch for the medium voltage is closed.

Preferably, in some embodiments of the present invention, by starting to charge the DC-Bus capacitor of a certain power module by use of the pre-charging unit to a voltage higher than a voltage at the power input end, no current may flow through that power module. As such, when a certain power module breaks down, only that power module is cut off while the other two power modules operate normally to supply the load; or, when the load of the power conversion system is light, a certain power module is cut off to realize low power output.

While the present invention has been disclosed in the above implementations, it is not intended to limit the present invention, and various modifications and retouches may be made by those skilled in the art without departing from the spirit and scope of the present invention. The scope of protection of the present invention therefore is subject to the scope defined by the appended claims.

What is claimed is:

1. A power conversion system connecting to a load, comprising:

a plurality of power modules, each including:

a power input end;

a charging input end;

a power output end;

at least one power conversion unit, each of the power conversion unit including an AC/DC conversion unit and at least one DC-Bus capacitor and being electrically connected to the power input end and the power output end, wherein the AC/DC conversion unit is electrically connected between the power input end and the DC-Bus capacitor; and a pre-charging unit electrically connected to the charging input end for receiving direct current and electrically connected to the DC-Bus capacitor, the pre-charging unit starting to charge the DC-Bus capacitor of one of the plurality of power modules when the one of the plurality of power modules breaks down or the load of the power conversion system is light so that no current flows through the AC/DC conversion unit, wherein, the power input ends of the plurality of power modules are connected in series and then electrically connected to an AC power source, and the power output ends of the plurality of power modules are connected in parallel;

wherein the AC/DC conversion unit comprises a bridge rectifier circuit which includes two bridge arms connected in parallel, each bridge arm including two transistors connected in series, wherein each of the transistors has a diode, and wherein driving signals for the transistors of the one of the plurality of power modules are cut off when the one of the plurality of power modules breaks down or the load of the power conversion system is light;

wherein the pre-charging unit charges the DC-Bus capacitor to a voltage higher than a voltage at the power input end so that the diode is off.

2. The power conversion system according to claim 1, the diode is a body diode of the transistor or an independent diode.

3. The power conversion system according to claim 1, wherein the pre-charging unit includes a pre-charging isolation unit which includes a plurality of secondary circuits.

4. The power conversion system according to claim 3, wherein each of the power conversion unit includes a plurality of the DC-Bus capacitors connected in series, and the secondary circuits of the pre-charging isolation unit are electrically connected to the DC-Bus capacitors connected in series, respectively.

5. The power conversion system according to claim 3, wherein each of the power modules includes a plurality of the power conversion units cascaded, and the secondary circuits of the pre-charging isolation unit are electrically connected to the DC-Bus capacitors in the cascaded power conversion units, respectively.

6. The power conversion system according to claim 1, further comprising:

a plurality of auxiliary power modules electrically connected to the charging input ends of the power modules, respectively, wherein the auxiliary power modules are DC/DC modules and are electrically connected to a storage battery, or the auxiliary power modules are AC/DC modules and are electrically connected to the AC power source.

7. The power conversion system according to claim 1, further comprising:

an auxiliary power module including an auxiliary power isolation unit, the auxiliary power isolation unit including a plurality of secondary circuits, wherein the secondary circuits of the auxiliary power isolation unit are electrically connected to the charging input ends of the plurality of power modules, respectively.

8. The power conversion system according to claim 7, wherein the auxiliary power module is an AC/DC module, and the input end of the auxiliary power module is electrically connected to the AC power source or a commercial power; or the auxiliary power module is a DC/DC module, and the input end of the auxiliary power module is electrically connected to a storage battery.

9. The power conversion system according to claim 1, wherein the pre-charging unit is configured to pre-charge the DC-Bus capacitor before the power conversion is performed through switching operations of the power modules and stop the pre-charging after a voltage of the DC-Bus capacitor reaches a threshold.

10. The power conversion system according to claim 1, wherein the pre-charging unit starts to charge the DC-Bus capacitor continuously or intermittently.

11. The power conversion system according to claim 1, wherein the AC/DC conversion unit further comprises a DC/DC converter, an output of the bridge rectifier circuit being connected to a supplemental DC-Bus capacitor and an input of the DC/DC converter, and an output of the DC/DC converter being connected to the DC-Bus capacitor, and wherein the pre-charging unit starts to charge the DC-Bus capacitor so that a voltage on the supplemental DC-Bus capacitor is higher than a voltage at the power input end, thereby the diode being off.

12. The power conversion system according to claim 1, wherein the AC/DC conversion unit comprises a three-level conversion circuit, wherein each of the three-level conversion circuits includes two bridge arms connected in parallel, each bridge arm including four transistors connected in series, each of the transistors having a diode, and the two transistors in the middle of each bridge arm being connected in parallel to two clamp diodes which are connected in series, and wherein the pre-charging unit charges the DC-Bus capacitor to a voltage higher than a voltage at the power input end so that the diode is off.

13. The power conversion system according to claim 12, wherein driving signals for the transistors of the one of the plurality of power modules are cut off when the one of the plurality of power modules breaks down or the load of the power conversion system is light.

* * * * *